United States Patent
Sautter et al.

(10) Patent No.: US 7,057,248 B2
(45) Date of Patent: Jun. 6, 2006

(54) SEMICONDUCTOR COMPONENT, PARTICULARLY A MICROMECHANICAL PRESSURE SENSOR

(75) Inventors: Helmut Sautter, Ditzingen (DE); Frank Schatz, Kornwestheim (DE); Juergen Graf, Stuttgart (DE); Hans Artmann, Magstadt (DE); Udo-Martin Gomez, Leonberg (DE); Kersten Kehr, Zwota (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 10/292,865

(22) Filed: Nov. 8, 2002

(65) Prior Publication Data

US 2003/0146447 A1 Aug. 7, 2003

(30) Foreign Application Priority Data

Nov. 8, 2001 (DE) .............................. 101 54 867

(51) Int. Cl.
*H01L 29/82* (2006.01)
*H01L 29/74* (2006.01)
*H01L 31/111* (2006.01)
*H01L 29/00* (2006.01)

(52) U.S. Cl. ...................... 257/419; 257/108; 257/415; 257/536

(58) Field of Classification Search ................ 257/415, 257/419, 536, 108
See application file for complete search history.

(56) References Cited

U.S. PATENT DOCUMENTS

| 3,994,009 A | * | 11/1976 | Hartlaub ...................... 257/419 |
| 4,332,000 A | * | 5/1982 | Petersen ................... 361/283.4 |
| 5,209,119 A | * | 5/1993 | Polla et al. .................... 73/723 |
| 5,242,863 A | * | 9/1993 | Xiang-Zheng et al. ........ 438/53 |
| 5,344,523 A |   | 9/1994 | Fung et al. |
| 5,445,991 A |   | 8/1995 | Lee |
| 5,511,428 A | * | 4/1996 | Goldberg et al. .............. 73/777 |
| 6,159,762 A | * | 12/2000 | Scheiter et al. ............... 438/53 |

FOREIGN PATENT DOCUMENTS

| DE | 100 32 579 | 1/2002 |
| EP | 0 941 460 | 5/2000 |
| EP | 1 114988 | 7/2001 |

\* cited by examiner

*Primary Examiner*—Steven Loke
*Assistant Examiner*—Samuel A. Gebremariam
(74) *Attorney, Agent, or Firm*—Kenyon & Kenyon

(57) ABSTRACT

A semiconductor component, in particular a micromechanical pressure sensor based on silicon, having a base layer, an at least largely self-supporting diaphragm and an overlayer situated on the diaphragm, the diaphragm and the base layer, at least from place to place, delimiting a void. Furthermore, at least from place to place, above the diaphragm a conducting region is provided in the overlayer which is electrically poorly conductive as compared to the conducting region, to which the surface of the diaphragm that faces the overlayer is able to be electrically contacted.

32 Claims, 2 Drawing Sheets

SEMICONDUCTOR COMPONENT, PARTICULARLY A MICROMECHANICAL PRESSURE SENSOR

FIELD OF THE INVENTION

The present invention relates to a semiconductor component configured as a micromechanical pressure sensor.

BACKGROUND INFORMATION

In the case of many pressure sensor elements patterned out of silicon by the application of surface micromechanics, the reference pressure cavern is produced so as to make possible an examination of the formation of the cavern in an "open" state. However, such a procedure is not possible in the case of semiconductor components and pressure sensor elements which are described in German Patent Application Number 100 32 579.3. Rather, in that case, producing the cavern or void by thermal treatment of the semiconductor material, that is, above all of silicon, requires new concepts for checking expansion and dimensioning of the void or diaphragm above it with respect to thickness and mobility. The usual standard methods for testing such voids, such as x-ray techniques, ultrasound analysis or thermographic analysis are too costly and not usable in mass production.

SUMMARY

An object of the present invention is to make available a semiconductor component which, after being produced in the "closed" state, is able to be tested in a simple way with respect to the formation of the cavern and the mobility of the diaphragm. During the production of pressure sensors based on porous silicon, whether the cavern generated or the void generated is being formed completely and correctly, and whether there might not be remainders of porous silicon or crystalline column structures in the area of the void which would hinder the desired free mobility of the diaphragm situated above the void are monitored.

Because of its design, the semiconductor component according to the example embodiment of the present invention may increase the ease of examining the generated diaphragm with respect to thickness, mobility and mechanical properties, such as its modulus of elasticity. Furthermore, the dimensions of the generated cavern or the generated void may be monitored, and the still present remains of, for instance, porous silicon or crystalline column structures (support locations) may be detected inside the void.

The semiconductor component, in an airtight, closed state may still be checked after the end of production, so that, after this examination, no further production steps follow that are relevant to the performance reliability of the diaphragm or to the assessment of the structure of the cavern.

Due to the construction of the semiconductor component, the diaphragm opposite the diaphragm floor, i.e. the side of the cavern opposite the diaphragm, may be set to a different electrical potential, so that information may be obtained on the mobility of the diaphragm and the structure and development of the void by way of static and/or dynamic capacitance measurements.

Thus, as a response to the formation of column structures in the region of the void, an electrical short-circuit appears in connection with such capacitance measurements in the borderline case, from which one may conclude that, in the region of the void, the diaphragm is supported by a column and is thereby impeded in its mobility.

It is further possible to set the diaphragm into oscillation, particularly resonant oscillation, via a capacitive excitation. From the resonant frequency and the quality of resonant oscillation, one may be able to draw conclusions on the freedom of motion of the diaphragm and possibly on columns being present even in the edge regions of the void. In addition, such a determination of the resonant frequency or analysis of the quality of the resonant oscillation offers the possibility of retroactively drawing conclusions on the material properties of the diaphragm, such as its modulus of elasticity and/or its thickness.

Finally, by a dying-out of the diaphragm, within the framework of these resonant oscillations, up to the limit stop, the height of the generated void is also able to be checked (maximum diaphragm deflection).

If the diaphragm is made of porous silicon and, on its side facing away from the base layer, is completely covered with the overlayer, the enclosed void or cavern may be closed off in a gastight fashion.

For the electrical insulation of the diaphragm from the area of the base layer which is located on the other side of the cavern, a circumferential edge layer may be furnished laterally around the void or the cavern, which, may be made of silicon, just as the diaphragm and the base layer, but which, in contrast to these, has a different doping, so that, between the diaphragm, the circumferential edge layer and the base layer a pnp junction is implemented which acts electrically insulating.

If the conductor region provided above the diaphragm has at least two subsections, the first subsection covering the entire surface of the side of the diaphragm facing away from the base layer, it is possible to contact the diaphragm electrically; and, starting from the surface of the overlayer, a second subsection of the conductive layer may be provided in the overlayer, which, at least from place to place, is in contact with the first subsection in an electrically conductive manner, and which is able to be electrically contacted on or in the overlayer, via printed circuit traces running there.

The first subsection of the conductor area may be produced in a simple manner by a temperature treatment of the semiconductor component during the course of which an out-diffusion of the doping of the diaphragm occurs into the area of the overlayer lying above it, which makes this diffusion region a comparatively well electrically conducting one, vis-à-vis the remainder of the detection layer.

In a corresponding manner, the second subsection of the conducting region provided in the region of the surface of the overlayer may be produced by a doping of the surface of the overlayer which, likewise, diffuses out during the course of this or a further temperature treatment, and leads to a diffusion region which thus defines the second subsection of the conducting layer. This second subsection of the conducting region, may be electrically well conducting compared to the remaining areas of the overlayer.

During the course of the temperature treatment, as soon as there is contact or an electrically conductive connection between the two subsections of the conducting layer, an electrical contacting of the diaphragm, closed off from the overlayer, is possible without a problem on its upper side, even in the closed state of the semiconductor component.

The conducting region and a plurality of second subsections of the conducting region, circular in a top view, which are, for example, in the area of the corners of the diaphragm, may be electrically connected to several printed circuit traces positioned on the diaphragm symmetrically with respect to a top view of it, to each of the second subsections of the conducting region a printed circuit trace being assigned. An even number of printed circuit traces, for example, four, may be provided, which may run along the plane diagonals, above the diaphragm designed, for example, to be rectangular, square, round or oval.

Because of such a symmetrical arrangement of the printed circuit traces, the means running along in the region of the overlayer, or on the overlayer, for induction and/or detection of a warping of the diaphragm, such as piezoresistive components or also heating elements, may not be differently influenced by lead wires.

DETAILED DESCRIPTION

Figure 1:
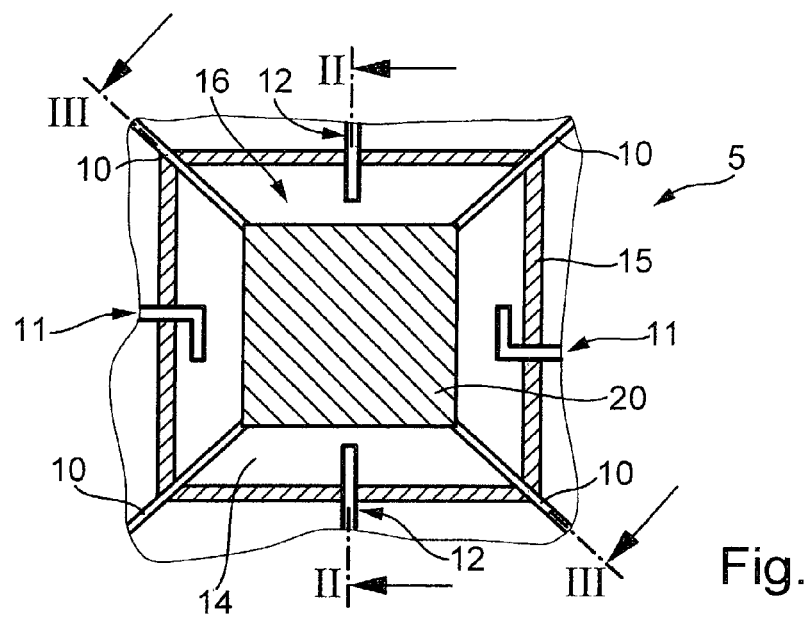
FIG. 1 illustrates a top view of an example embodiment of a semiconductor component according to the present invention in the form of a micromechanical pressure sensor.

FIG. 1 illustrates a semiconductor component in the form of a pressure sensor element 5 produced by surface micromechanical technique for the atmospheric pressure or near-atmospheric pressure range. This pressure sensor element 5 may be produced on the basis of porous silicon technology, such as is described in German Application Number 100 32 579.3 with respect to construction design and production method, and including modifications according to the present invention as described below.

In FIG. 1 there is first shown in top view of pressure sensor element 5, how, on the surface or in the area of an overlayer of n-doped silicon, for example, episilicon, first actor elements 11 and second actor elements 12, each, for instance, in the form of piezoresistors or structured piezoresistive layers, are provided. These may be, for example, made of silicon suitably doped in a conventional manner. FIG. 1 also shows that on the surface, or in the area of the surface of the overlayer, run printed circuit traces 10, which, for example, are likewise made of correspondingly doped silicon.

In addition, it is shown in FIG. 1 that actor elements 11, 12 end in an edge area region 14 which is, for example, made of n-doped silicon, particularly episilicon, while printed circuit traces 10 are guided beyond these edge area regions 14 into a diaphragm region 16, which is formed rectangularly in top view or, for example, square.

Figure 2:
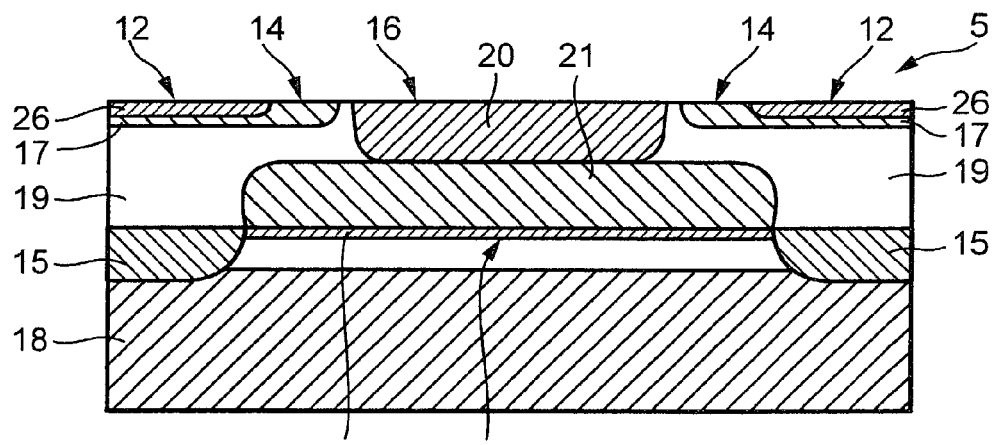
FIG. 2 illustrates a cross sectional view along the vertical section line drawn in FIG. 1.

Below diaphragm area region 16 and below the overlayer there is a diaphragm 22, not visible in FIG. 1, which covers a cavern or a void 23. First actor elements 11 are, in addition, for example, bent over at right angles in the vicinity of edge area region 14, which simplifies the warping of diaphragm 22 or also the detection of the warping of diaphragm 22. This may achieve a more uniform, desired feeding of force into diaphragm 22, for example, in the edge region of diaphragm 22. In FIG. 2 it may be seen that edge area region 14 extends into the region above diaphragm 22, for example, as far as possible.

Actor elements 11, 12 may be used for the warping as well as the detection of the warping of diaphragm 22, for instance, by a changing external pressure. Thus, actor elements 11, 12 may also be designed and operated as sensing elements or as passive components, such as piezoresistive resistors.

FIG. 2 shows a cross sectional view of FIG. 1 along the vertical section line drawn in, second actor elements 12 being recognizable in the region of the surface of overlayer 19. These are each formed from a first, suitably structured conducting layer 26 which may be used for the electrical contacting and the supply or removal of electrical current, as well as from an actor layer 17 which separates conducting layer 26 from overlayer 19 and may be electrically contacted via it, which runs below first conducting layer 26. Actor layer 17 may be, for instance, a piezoelectric or piezoresistive layer.

FIG. 2 also shows that overlayer 19 runs above a base layer 18 or a substrate made, for example, of p-doped silicon, a block-shaped void 23 being enclosed between base layer 18 and overlayer 19, which is delimited from overlayer 19 by diaphragm 22. In the edge region of cavern 23, between base layer 18 and overlayer 19, an edge layer 15 may also be provided, made, for example, of n-doped silicon, which runs around void 23 and is in contact with diaphragm 22 in an encircling manner. This edge layer 15 is also indicated in FIG. 1 as being encircling, however, there it is not visible in the top view.

Diaphragm 22 is made, for instance, of p-doped silicon, which may be porous silicon. Its thickness may range, for example, from to 0.5 μm to 1.0 μm, at a lateral extension in each direction between 100 μm and 800 μm, depending on the pressure range. Overlayer 19 may be gastight and thereby closes off void 23 in a gastight manner from the outer atmosphere. Its thickness may range, for example, from 5 μm to 10 μm, and the height of cavern 23 may lie, for example, between 3 μm and 7 μm. This ensures that, when there is a change in the external pressure, a bending deformation of diaphragm 22 and also overlayer 19 takes place, which is of an order of magnitude of 0.5 μm/bar to 5 μm/bar, especially 1 μm/bar to 2 μm/bar.

Figure 3:
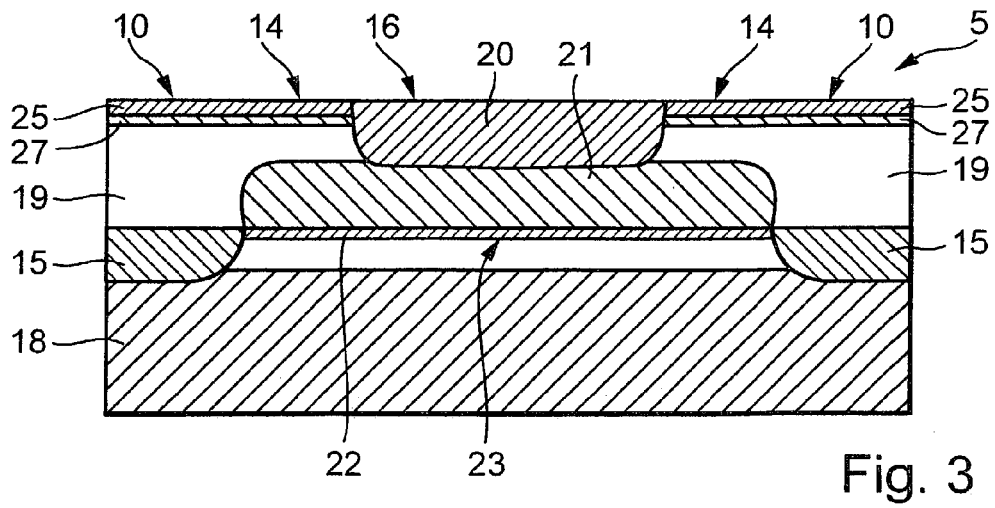
FIG. 3 illustrates a cross sectional view along the diagonal section line drawn in FIG. 1.

FIG. 3 shows a cross sectional view through FIG. 1, along the diagonals, printed circuit traces 10 now being recognizable in the area of the surface of overlayer 19, each of which is made of a second, for example, $p^+$-doped and comparatively low-resistance conducting layer 25, which may be used for electrical supply or electrical contacting, as well as a separating layer 27 present below it, which may be, for instance, $p^-$-doped and of comparatively high resistance. An electrical insulation of separating layer 27 and conducting layer 25 from overlayer 19 may be ensured, in this case, by the pn junction obtained.

Both second conducting layer 25 and separating layer 27 may be, for example, made of silicon which may be, in each case, suitably and differently doped. In FIG. 3, printed circuit traces 10 extend into diaphragm area region 16.

In FIGS. 2 and 3, above diaphragm 22, a first conducting region 21 made of doped silicon is provided, which conducts well compared to remaining overlayer 19. This first conducting region 21 covers the entire surface of the surface of diaphragm 22 facing away from base layer 18. Furthermore, a second conducting region 20 made of p-doped silicon is provided, proceeding from the surface of overlayer 19 facing away from diaphragm 22, which also conducts well, compared to remaining overlayer 19. Second conducting region 20 and first conducting region 21 are in contact with each other, or rather pass over into each other, at least from place to place, so that thereby electrical contacting of the entire surface of diaphragm 22 may be possible, starting from the surface of overlayer 19. According to FIG. 2 or 3, second conducting region 20 extends to the outer surface of semiconductor component 5 and is thus directly accessible from there, as shown in FIG. 1 in a top view.

According to FIG. 3, printed circuit traces 10 are connected in electrically conducting fashion to second conducting region 20, while second actor elements 12 are electrically insulated from second conducting region 20. In addition, according to FIGS. 2 and 3, first conducting region 21 is electrically insulated from base layer 18, since, in the construction, a pnp junction has formed between base layer 18, edge layer 15 and diaphragm 22 or first conducting region 12.

In the example embodiment according to FIGS. 1 to 3, diaphragm 22 is electrically insulated from the bottom of cavern 23 formed by base layer 18, and at the same time, an electrical lead or an electrical contacting possibility from the surface of overlayer 19 to diaphragm 22 exists.

For the analysis of the mobility of the diaphragm and the extension and cavern 23, conventional means may be provided, by the use of which a predefinable and or variably adjustable electrical voltage may be applied and/or particularly measured as a function of time between the surface of diaphragm 22 facing void 23 and the part of the surface of base layer 18 lying opposite diaphragm 22, or by the use of which at least this surface of diaphragm 22 opposite the surface of base layer 18 may be set to a specific electrical potential, for example, one that is changeable as a function of time.

The means may be electrical components by the use of which, for example, a static measurement of the capacitance between the surface of diaphragm 22 facing void 23 and the part of the surface of base layer 18 lying opposite diaphragm 22 may be carried out. Furthermore, using these components, a possibly present electrical short-circuit may also be detected between the surface of diaphragm 22 facing void 23 and the part of the surface of base layer 18 delimiting void 23 and lying opposite diaphragm 22.

With the aid of the named electrical components, diaphragm 22 may be set into oscillation, for example, a resonant oscillation, by capacitive excitation. At the same time, these may be used for the analysis of the oscillation produced, particularly of the measurement of the resonant frequency and/or the quality of the resonant oscillation, in order thereby to determine mechanical properties of diaphragm 22 as well as its mobility with respect to void 23, and/or its modulus of elasticity and/or its lateral extension or thickness. Suitable components for this and their interconnection are sufficiently well known from the related art, and do not require detailed explanation here.

As a matter of priority, the preceding explained analysis may determine the electrical capacitance between the lower side of the diaphragm and the cavern floor, which, in the static case, may permit a statement to be made about the cavern height and possibly about shunts or short-circuits, for instance, due to remains of porous silicon or columns in cavern 23.

In the case of excitation of an oscillation, such as a resonant oscillation, one also obtains from the analysis, such as with respect to frequency and quality of the oscillation, for example, under consideration of the electrical capacitance, information about the mobility of diaphragm 23, about its maximum deflection, about reinforcement or support locations of diaphragm 22 in the region of cavern 23, or even about mechanical properties of the diaphragm, such as its thickness or its modulus of elasticity.

Figure 4:
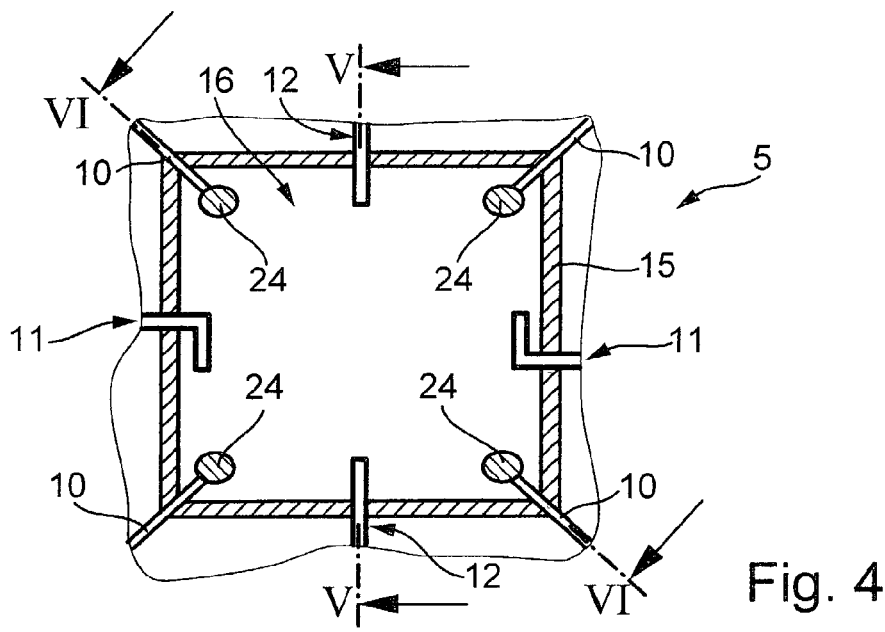
FIG. 4 illustrates a second example embodiment of a semiconductor component in the form of a micromechanical pressure sensor according to the present invention.
Figure 5:
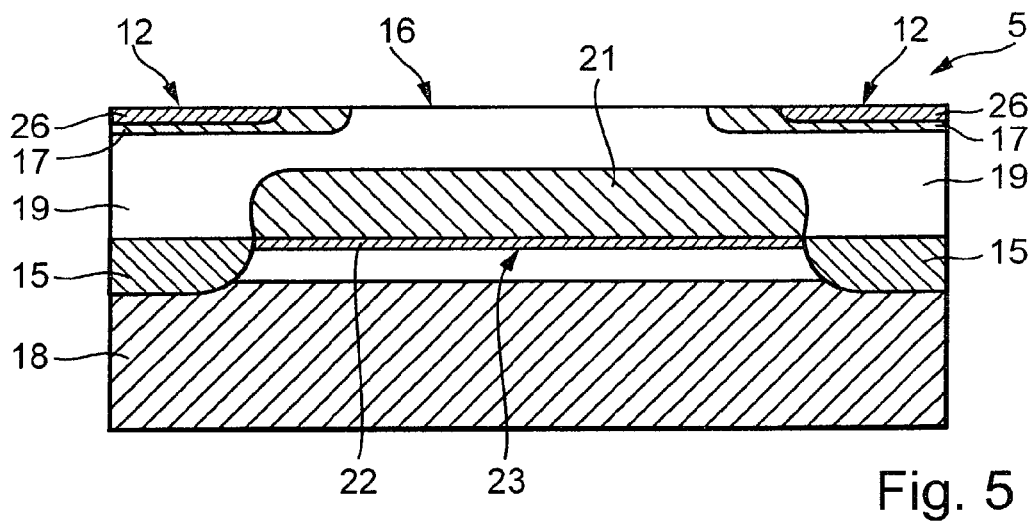
FIG. 5 illustrates a cross sectional view along the vertical section line drawn in FIG. 4.
Figure 6:
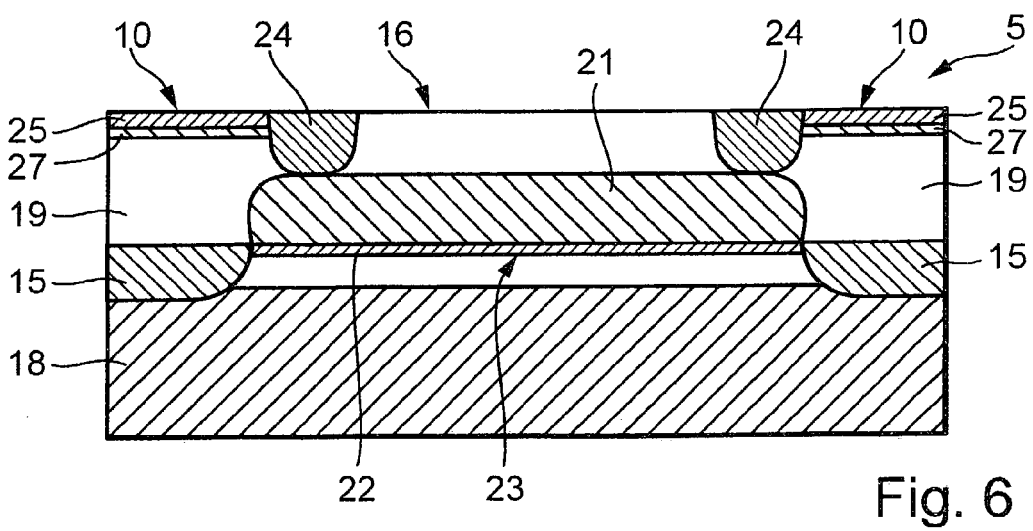
FIG. 6 illustrates a cross sectional view along the diagonal section line drawn in FIG. 4.

FIGS. 4 to 6 explain an alternative example embodiment to that in FIGS. 1 to 3, for a semiconductor component in the form of a micromechanical pressure sensor element 5, which differs from the first exemplary embodiment in that second conducting region 20, as in FIG. 2 or 3, is developed dot-shaped or circular in top view, in the region of third conducting regions 24 positioned in the corners of diaphragm 22. This is shown in FIG. 6, which shows a section along the diagonal shown in FIG. 4.

According to this example embodiment, it may not be necessary to introduce printed circuit traces 10 into the region above diaphragm 22, and third conducting regions 24 are limited to relatively tightly defined regions within overlayer 19, which have been produced by a suitable local doping of overlayer 19, such as with the aid of an appropriate mask. Thus, according to FIG. 4, diaphragm area region 16 provided in FIG. 1 may also remain electrically insulating, i.e., it is developed farther away from overlayer 19 of electrically insulating material or of a material such as n-doped silicon that is comparatively poorly electrically conductive, compared to conducting regions 20, 21, 24.

First actor elements 11 and/or second actor elements 12 are not essential for the functioning of the explained pressure sensor, since a warping of diaphragm 22 may, for example, also be detected by a change in capacitance between diaphragm 22 and base layer 18, due to a changing exterior pressure.

Furthermore, actor elements 11, 12 may also be developed as heating elements or heat conductors, which may effect warping of diaphragm 22, via a heat supply and mechanical stresses induced thereby.

Finally, the function of a printed circuit trace 10 and an actor element 11, 12 may also be unified in one structural element, with the use of which, then, in each case, both electrical contacting of second conducting region 20 and of third conducting region 24, as well as warping of diaphragm 22, may be induced or detected.

What is claimed is:

1. A semiconductor component, comprising:
   a base layer;
   a diaphragm disposed above the base layer, the diaphragm being at least largely self-supporting, the diaphragm and the base layer delimiting a void;
   an overlayer disposed on the diaphragm; a conducting region disposed in the overlayer, at least a portion of the overlayer being electrically poorly conductive as compared to the conducting region, a surface of the diaphragm that faces the overlayer being configured to directly electrically contact the conducting region, wherein:
   an edge layer is disposed between the overlayer and the base layer and configured to run around the void, the void being enclosed by the diaphragm, the base layer and the edge layer, and
   an entire surface of the diaphragm facing the overlayer is in contact with the conducting region.

2. The semiconductor compound according to claim 1, wherein the semiconductor component is a micromechanical pressure sensor.

3. The semiconductor component according to claim 2, wherein the edge layer is configured to run laterally around the void.

4. The semiconductor component according to claim 1, wherein the diaphragm is made of porous silicon and is completely covered, on a side facing away from the base layer, by the overlayer in such a way that the void is at least largely closed off in a gastight manner.

5. The semiconductor component according to claim 1, wherein the diaphragm and the base layer are comparatively electrically well conducting.

6. The semiconductor component according to claim 1, wherein the diaphragm and a region of a surface of the base layer lying opposite the diaphragm and delimiting the void from regions of the overlayer not occupied by the conducting region are comparatively electrically well conducting.

7. The semiconductor component according to claim 1, further comprising:
   an arrangement configured to at least one of apply and measure an electrical voltage between a surface of the diaphragm facing the void and a part of a surface of the base layer lying opposite the diaphragm.

8. The semiconductor component according to claim 7, wherein the electrical voltage is at least one of predefinable and variably adjustable.

9. The semiconductor component according to claim 7 wherein the electrical voltage is applied or measured as a function of time.

10. The semiconductor component according to claim 1, further comprising:
an arrangement configured to apply at least one of a predefinable electrical voltage and a variably adjustable electrical voltage in at least a region of a surface of the base layer lying opposite the diaphragm and delimiting the void.

11. The semiconductor component according to claim 1, further comprising:
an arrangement configured to measure an electrical voltage present in at least a region of a surface of the base layer lying opposite the diaphragm and delimiting the void.

12. The semiconductor component according to claim 11, wherein the arrangement measures the electrical voltage as a function of time.

13. The semiconductor component according to claim 7, further comprising:
electronic components configured to perform static measurement of a capacitance between a surface of diaphragm facing the void and a part of a surface of the base layer lying opposite the diaphragm.

14. The semiconductor component according to claim 1, further comprising:
electronic components configured to detect an electrical short-circuit between a surface of the diaphragm facing the void and a part of a surface of the base layer lying opposite the diaphragm and delimiting the void.

15. The semiconductor component according to claim 14, wherein the mechanical properties of the diaphragm include at least one of: a modulus of elasticity of the diaphragm, a lateral extension of the diaphragm, a thickness of the diaphragm, a mobility of the diaphragm with respect to the void, a presence of support locations in the void, a position of support locations in the void, a measurement of a resonant frequency of the oscillation of the diaphragm, and a quality of the resonant oscillation of the diaphragm.

16. The semiconductor component according to claim 1, further comprising:
electronic components configured to set the diaphragm into oscillation in accordance with a capacitive excitation; and
electronic components configured to determine by an analysis of this oscillation, mechanical properties of the diaphragm.

17. The semiconductor component according to claim 16, wherein the oscillation is a resonant oscillation.

18. The semiconductor component according to claim 1, wherein the overlayer, the base layer, the diaphragm, and the edge layer are made of silicon.

19. The semiconductor component according to claim 18, wherein the overlayer, the base layer, the diaphragm, and the edge layer are made of suitably differently doped silicon.

20. The semiconductor component according to claim 1, wherein the base layer lies at least partially below the diaphragm.

21. The semiconductor component according to claim 1, wherein the base layer is spaced apart from the diaphragm.

22. A semiconductor component, comprising:
a base layer;
a diaphragm disposed above the base layer, the diaphragm being at least largely self-supporting, the diaphragm and the base layer delimiting a void;
an overlayer disposed on the diaphragm;
a conducting region disposed in the overlayer, at least a portion of the overlayer being electrically poorly conductive as compared to the conducting region, a surface of the diaphragm that faces the overlayer being configured to directly electrically contact the conducting region, wherein the conducting region includes at least two partial regions, a first one of the partial regions covering an entire surface of a side of the diaphragm facing away from the base layer and being electrically contactable, and
a second one of the partial regions being provided in the overlayer in an electrically conductive manner and in contact with at least one printed circuit trace guided on or in the overlayer.

23. The semiconductor component according to claim 22, wherein a plurality of the second one of the partial regions are electrically contactable with a plurality of printed circuit traces positioned symmetrically to the diaphragm with respect to a top view.

24. The semiconductor component according to claim 23, wherein the plurality of printed circuit traces includes, 2n printed circuit traces where n is a positive integer.

25. The semiconductor component according to claim 23, wherein the diaphragm, in a top view, is configured as a rectangle, and the printed circuit traces run parallel on plane diagonals of the rectangle.

26. The semiconductor component according to claim 25, wherein the diaphragm, in the top view, is configured as a square.

27. The semiconductor component according to claim 23, wherein the plurality of the second one of the partial regions, in a top view of the diaphragm, is configured in the form of approximately round conducting dots, a number of the conducting dots corresponding to a number of the printed circuit traces provided.

28. The semiconductor component according to claim 27, wherein the conducting dots are positioned on the diaphragm symmetrically and are electrically connected to the printed circuit trace respectively allocated to the conducting dot.

29. The semiconductor component according to claim 27, wherein the conducting dots are positioned in a vicinity of corners of the diaphragm.

30. The semiconductor component according to claim 1 or 22, further comprising:
at least one arrangement configured to at least one of induce and detect a warping of the diaphragm in at least one place on or in the overlayer.

31. The semiconductor component according to claim 30, wherein the arrangement is a heating element.

32. The semiconductor component according to claim 30, wherein the arrangement is a piezoresistive resistor.

* * * * *